March 15, 1927.
A. LAMBLIN
RADIATOR
1,620,769
Filed Oct. 24, 1923    11 Sheets-Sheet 1
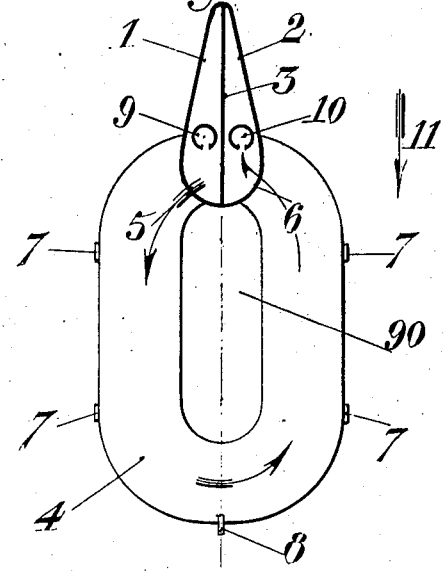
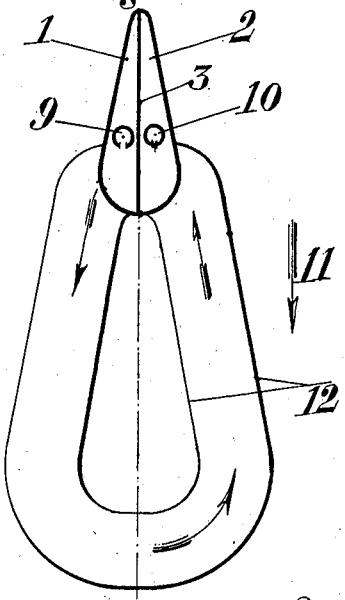
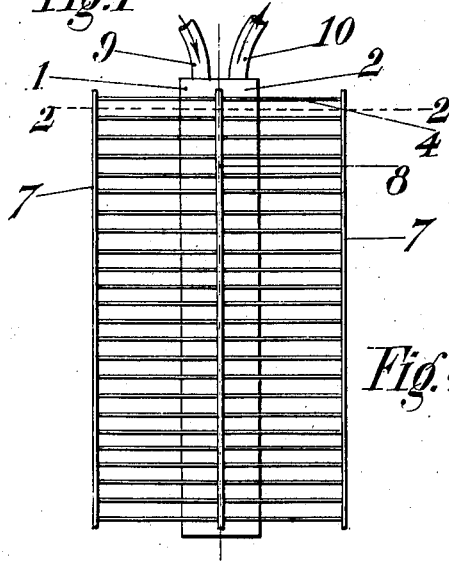
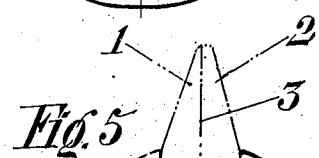
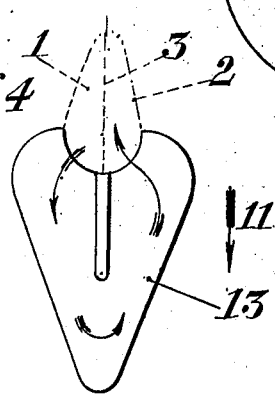
ALEXANDRE LAMBLIN
INVENTOR;
By
his Attorney.

March 15, 1927.

A. LAMBLIN

RADIATOR

Filed Oct. 24, 1923

ALEXANDRE LAMBLIN
INVENTOR;

By
his Attorney.

March 15, 1927.  A. LAMBLIN  1,620,769
RADIATOR
Filed Oct. 24, 1923    11 Sheets-Sheet 3
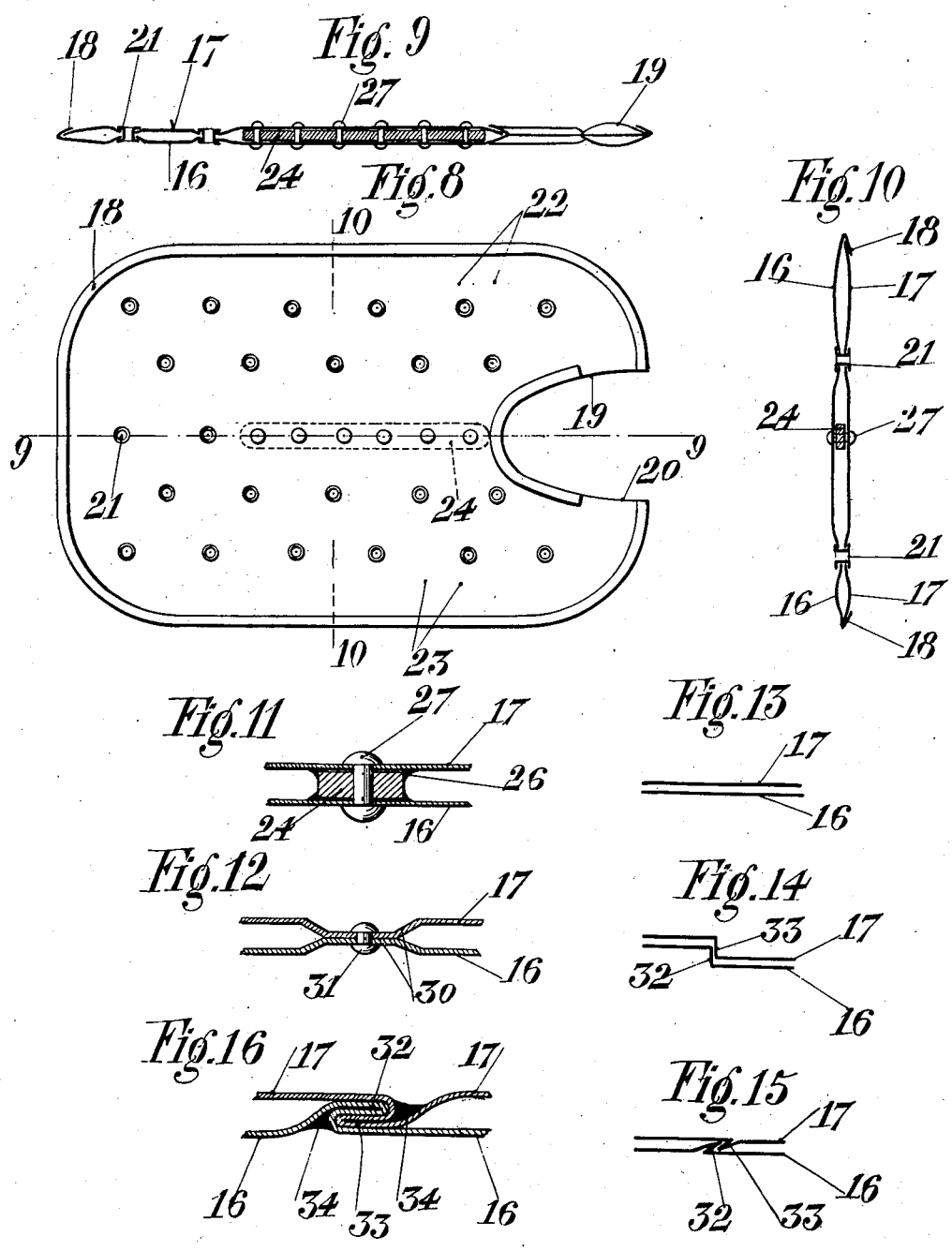
ALEXANDRE LAMBLIN
INVENTOR;
By
his Attorney.

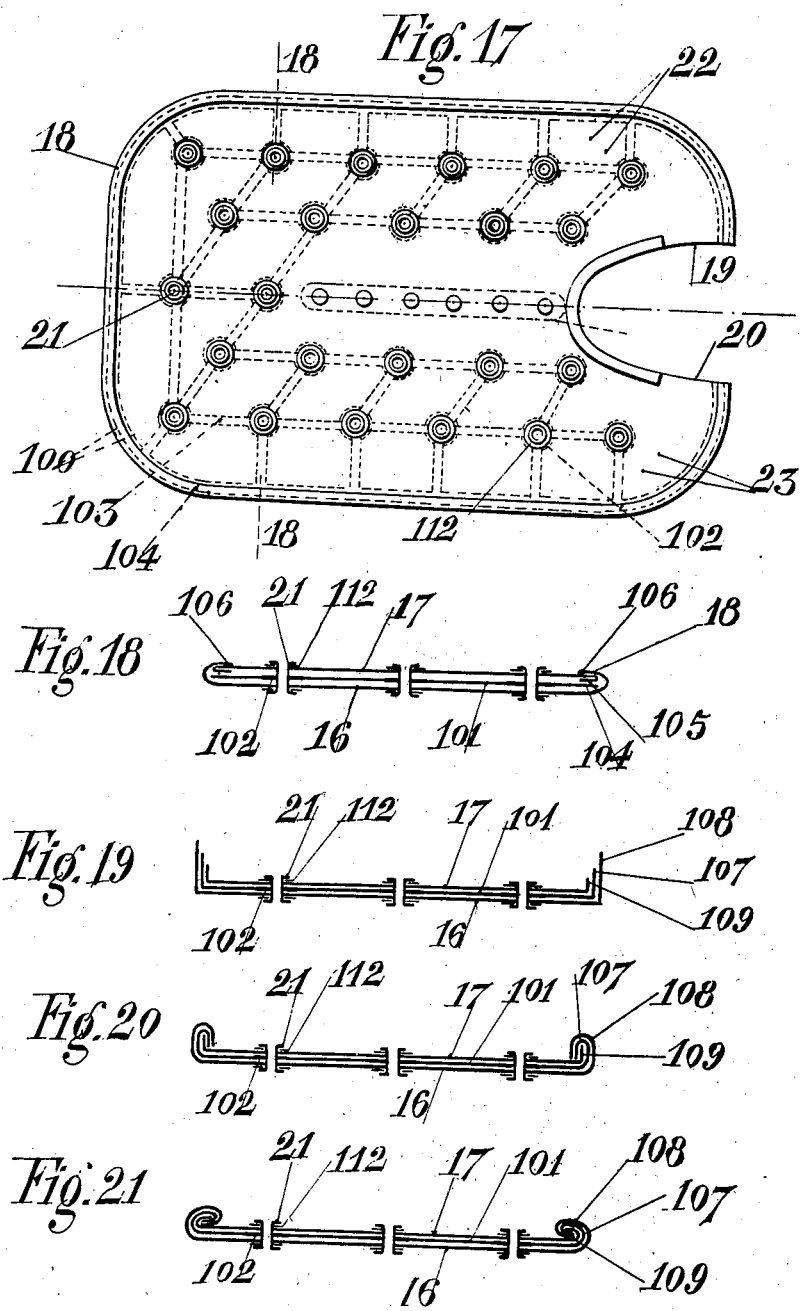

March 15, 1927.
A. LAMBLIN
RADIATOR
Filed Oct. 24, 1923    11 Sheets-Sheet 5
1,620,769
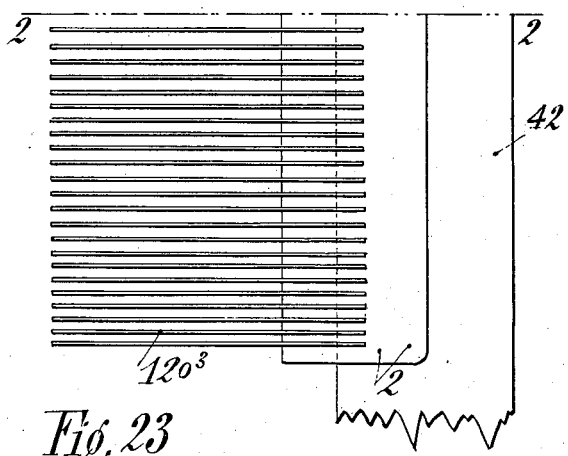
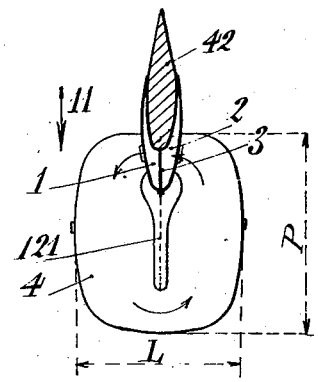
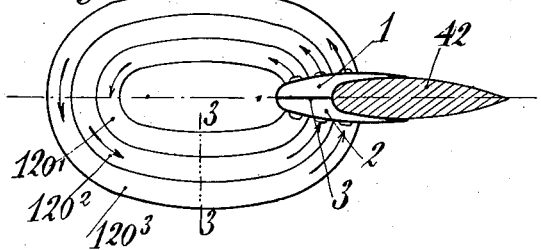
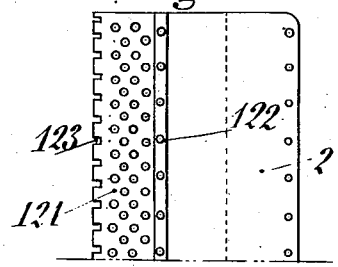
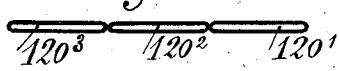
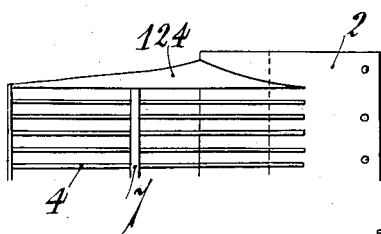
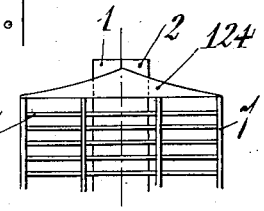
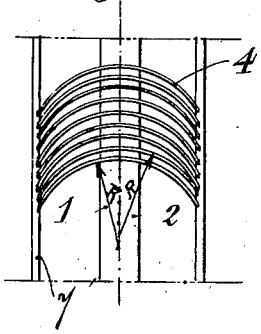
ALEXANDRE LAMBLIN
INVENTOR:
By *his* Attorney.

March 15, 1927.
A. LAMBLIN
RADIATOR
Filed Oct. 24, 1923    11 Sheets-Sheet 6
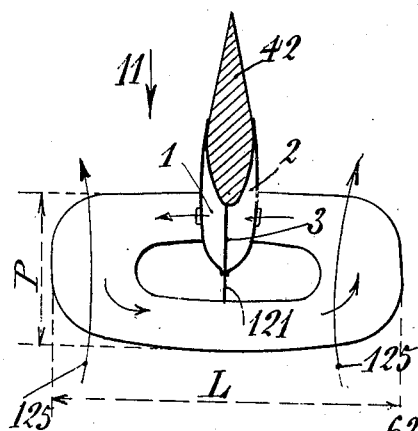
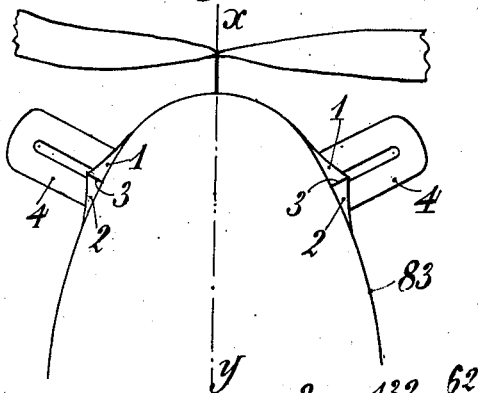
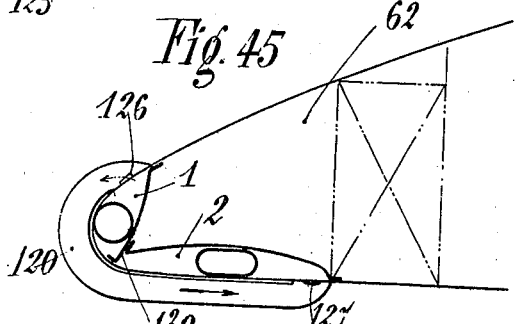
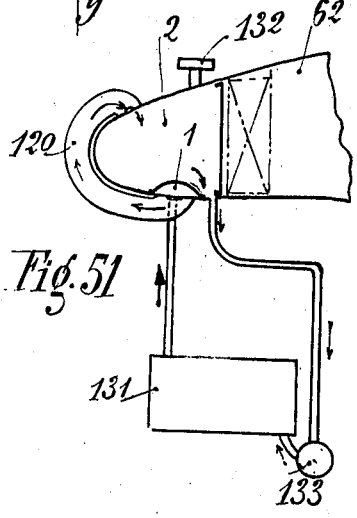
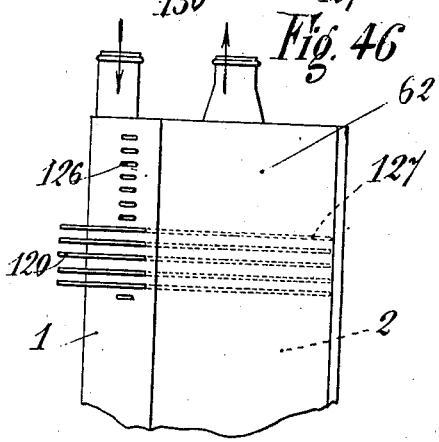
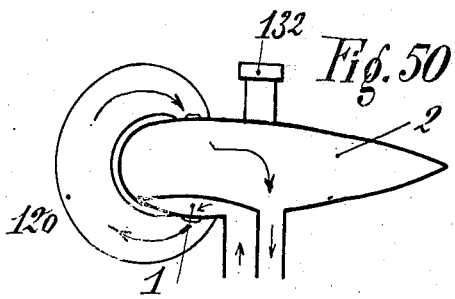
ALEXANDRE LAMBLIN
INVENTOR;
By
his Attorney.

March 15, 1927.
A. LAMBLIN
1,620,769
RADIATOR
Filed Oct. 24, 1923
11 Sheets-Sheet 7
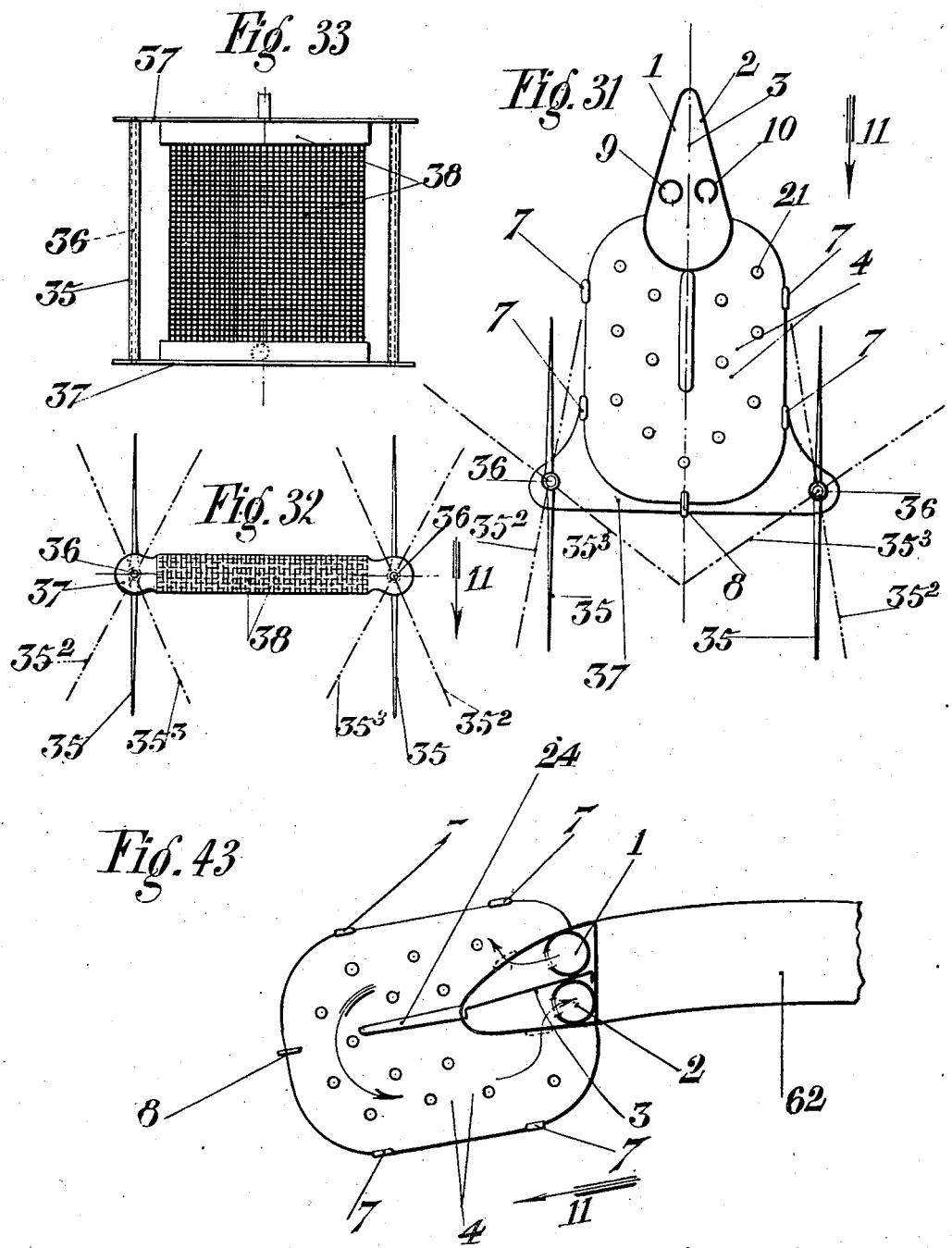
ALEXANDRE LAMBLIN
INVENTOR;
his Attorney.

March 15, 1927.
A. LAMBLIN
1,620,769
RADIATOR
Filed Oct. 24, 1923
11 Sheets-Sheet 8
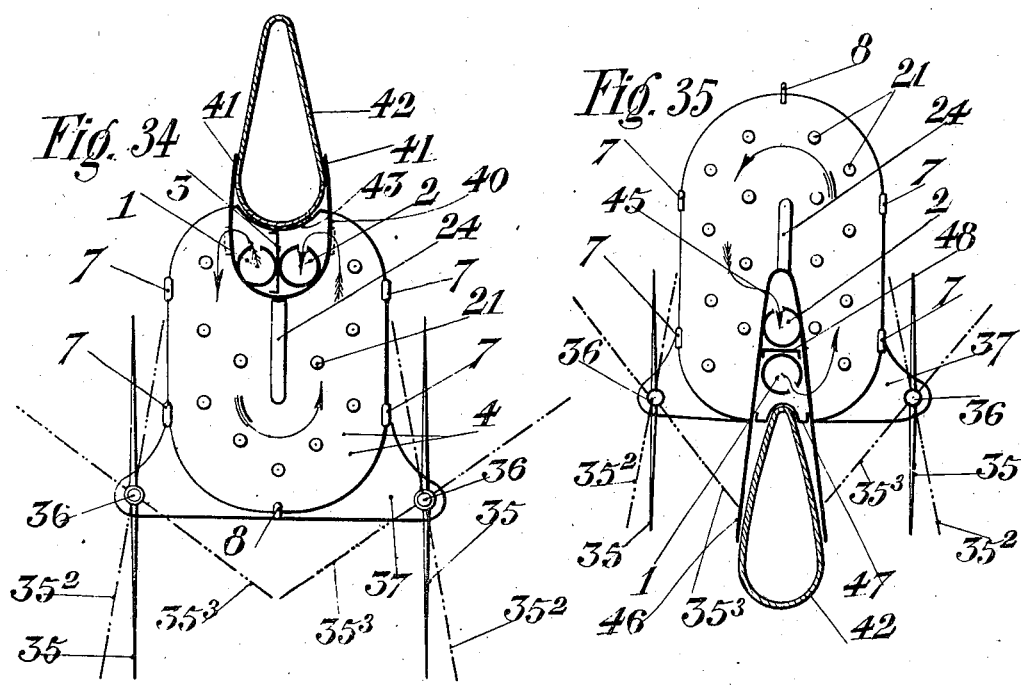
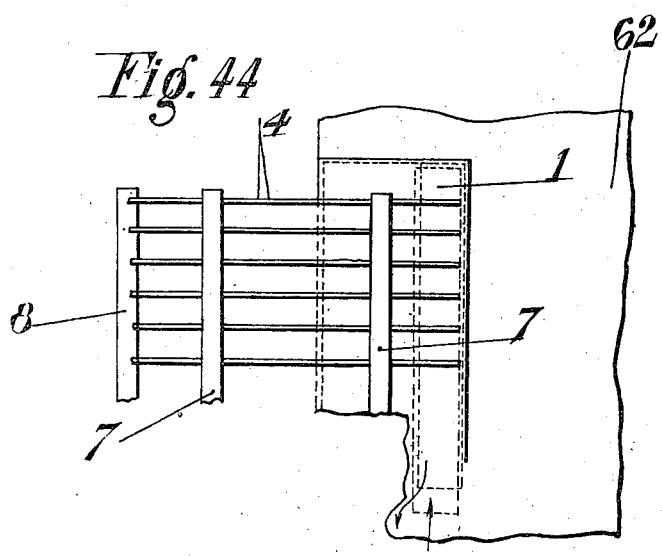
ALEXANDRE LAMBLIN
INVENTOR
By
his Attorney.

March 15, 1927.
A. LAMBLIN
RADIATOR
Filed Oct. 24, 1923 11 Sheets-Sheet 9
1,620,769
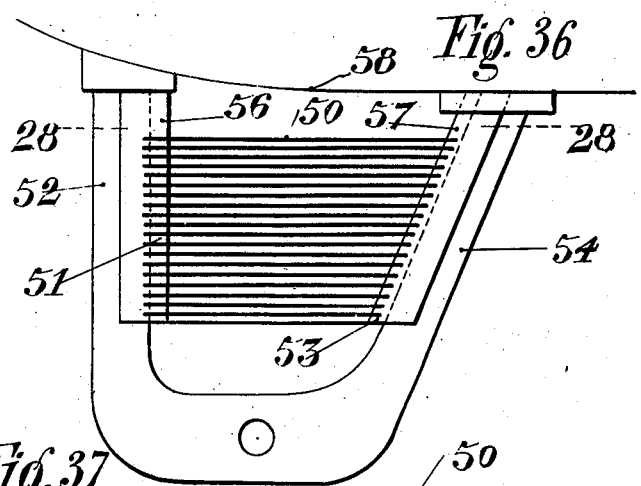
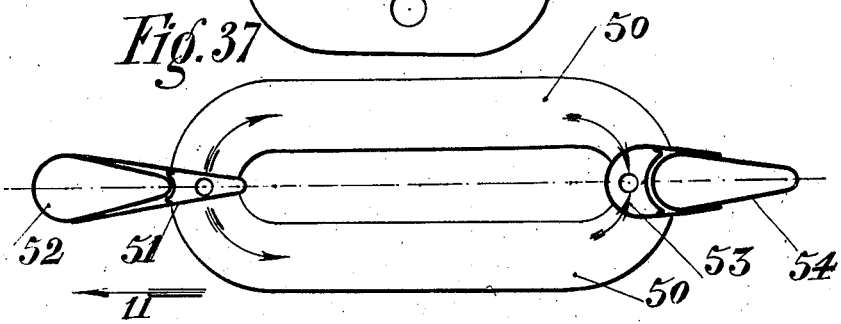
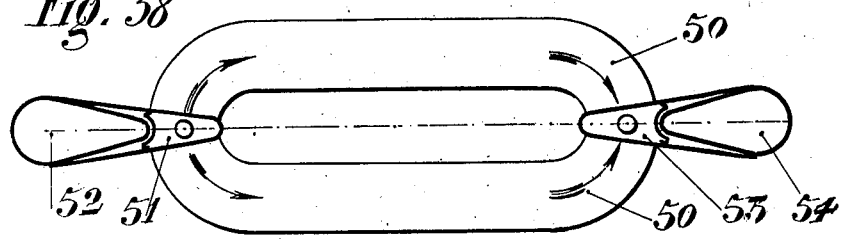
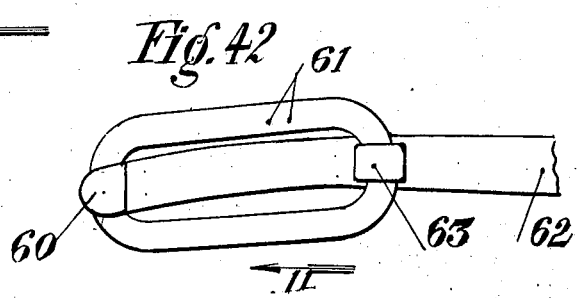
ALEXANDRE LAMBLIN
INVENTOR;
By Otto Munk
his Attorney.

Alexandre Lamblin
Inventor:

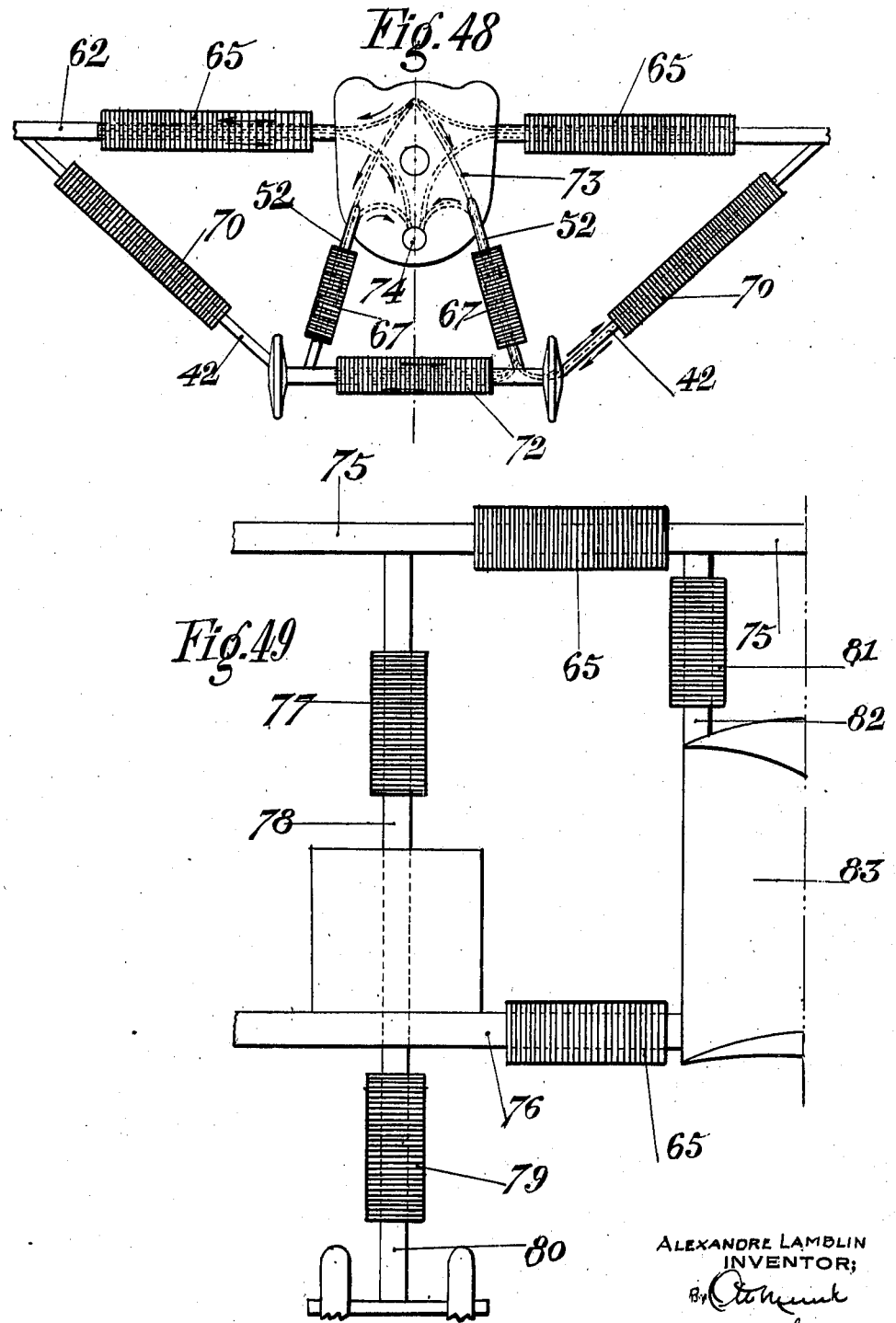

Patented Mar. 15, 1927.

1,620,769

UNITED STATES PATENT OFFICE.

ALEXANDRE LAMBLIN, OF PARIS, FRANCE.

RADIATOR.

Application filed October 24, 1923, Serial No. 670,449, and in France November 10, 1922.

The object of the present invention is firstly to provide a radiator which shall offer as small an amount of resistance as possible to the forward movement of the machine.

The radiator comprises substantially loop-shaped cooling elements each of which communicates at its ends with inlet and outlet headers for the water, the resistance to the forward movement of the whole of the radiator thus constituted being practically reduced to the resistance due to the whole of these two juxtaposed headers, this arrangement permitting also of the air coming in direct contact with the cooling elements without encountering any obstacle.

The transverse sections of the two headers are chosen advantageously so that by their juxtaposition they constitute the correct tapered section, that is to say wide at the front and tapering off to a point at the rear.

The present invention extends also to a particular method of mounting a radiator on aircraft, such method of mounting being characterized by the fact that one at least of the headers of the radiator is connected to one of the elements of the machine such as the mast, main girder, etc., this header forming part of or completing the form of this element which advantageously presents the correct tapered section, that is to say wide at the front and tapering off to a point at the rear.

Various arrangements according to the present invention are shown by way of example in the accompanying drawings in which:—

Figure 1 is an elevation of a radiator according to the present invention.

Figure 2 is a section of this radiator on a horizontal plane along the line 2—2 of Figure 1.

Figures 3, 4, 5, 6 and 7 are sections on horizontal planes of five varieties of the invention.

Figure 8 is a plan view of a cooling element according to the present invention.

Figures 9 and 10 are two sections on two vertical planes of the preceding element these sections being taken on the lines 9—9 and 10—10 respectively of Figure 8.

Figure 11 is a section on a larger scale of the partition or midfeather separating the two arms of the loop of the element.

Figure 12 is a section of a modification of the method of assembly employed in constructing this partition or midfeather.

Figures 13, 14 and 15 are three diagrammatic figures illustrating three successive phases in the manufacture of a cooling element constructed according to the present invention.

Figure 16 is a section of the finished partition or midfeather which separates the two arms of the loop formed by this element from each other.

Figure 17 is a plan view of a cooling element constructed according to a particular method of manufacture.

Figure 18 is a transverse section of the preceding element on the line 18—18 of Figure 17.

Figures 19, 20 and 21 are three sections of another mode of manufacturing the element, these three sections corresponding to three successive phases of the manufacture.

Figure 22 is an elevation of another loop radiator according to this invention.

Figure 23 is a horizontal section of this radiator on the line 2—2 of Figure 22.

Figure 24 is a vertical section of the radiator on the line 3—3 of Figure 23.

Figure 25 is a horizontal section of another improved radiator according to this invention.

Figure 26 is a side view of the headers and of the cross tie of the radiator shown in Figure 25 the cooling elements being removed.

Figure 27 is a front view of another radiator according to the present invention.

Figures 28 and 29 are a side view and an elevation respectively of another radiator according to this invention.

Figure 30 is a horizontal section of another radiator according to this invention.

Figure 31 is a horizontal section of a radiator provided with an arrangement for regulating the admission of the air to which this invention extends.

Figures 32 and 33 are a plan view and an elevation respectively showing the application of the preceding arrangement to a radiator of the "honeycomb" type.

Figures 34 and 35 are two horizontal sections of radiators the headers of which approximate to the form of a strut or a main girder of the machine.

Figure 36 is a section of the machine through its longitudinal plane of symmetry, this section showing a radiator interposed between two front and rear main girders of the landing carriage.

Figure 37 is a horizontal section of the preceding arrangement on the line 28—28 of Figure 36.

Figure 38 is a horizontal section similar to Figure 37 and corresponding to a modification of this arrangement.

Figure 39:
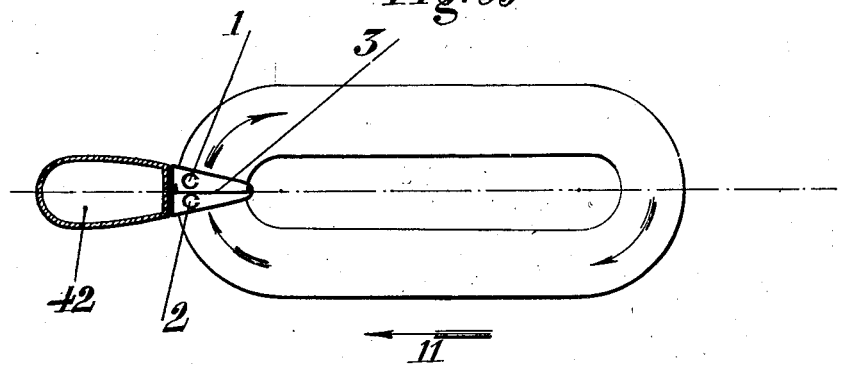
Figure 40:
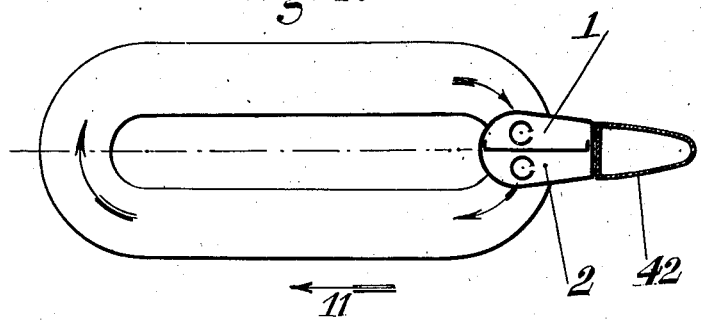

Figures 39 and 40 are two horizontal sections of two aeroplane struts combined with radiator headers.

Figure 41:
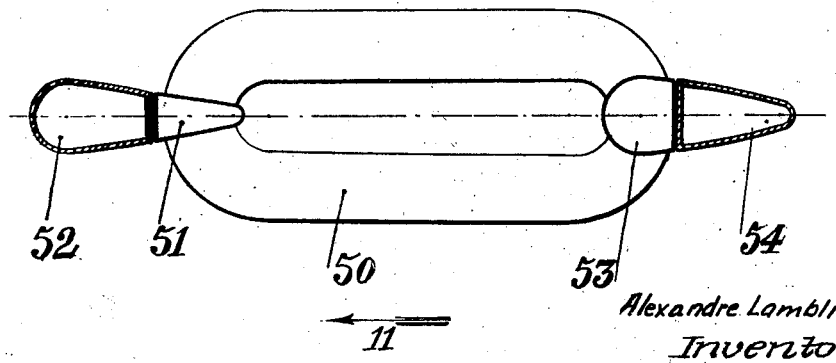

Figure 41 is a horizontal section of two main girders of a landing train with which both headers of one and the same radiator are combined.

Figure 42 is a section, on a plane parallel to the longitudinal plane of the machine, of an aeroplane wing the leading edge of which is constituted by the front header of the radiator.

Figure 43 is a section of an aeroplane wing, showing a radiator mounted on this wing, according to a modification of the invention.

Figure 44 is a partial plan of the aeroplane wing shown in Figure 43.

Figures 45 and 46 are a vertical section and a partial plan view respectively of another radiator the connected headers of of which form the leading edge of the wing.

Figure 47 is a diagrammatic plan view of the hull of an aeroplane provided with a loop radiator according to this invention.

Figures 48 and 49 are two elevations of a monoplane and a twin motor biplane machine respectively, these two figures indicating different positions which the radiators may occupy on the machine according to the present invention.

Figure 50 is a section of a feeder on which a loop radiator is mounted.

Figure 51 is a section of a cooling arrangement similar to the one shown in Figure 50 and mounted in the wing of an aeroplane.

The radiator (see Figures 1 and 2) comprises a header 1 provided with a pipe 9 for the admission of hot water and a header 2 with a pipe 10 for the outlet of the cooled water, the two headers being juxtaposed and separated from each other by a common partition or midfeather 3. The correct section of the whole of these two headers 1 and 2 effects a tapered shape that is to say one which is wide at the front and tapers off to a point at the rear.

Each cooling element 4 is formed by a thin strip which effects the form of a loop with a central opening 90, the two ends 5 and 6 of this loop communicating with the inlet header 1 and the outlet header 2 respectively.

The various cooling elements are kept at a suitable distance from each other by vertical lateral cross ties 7. A vertical central cross tie 8 may also be provided having a correctly-shaped flattened cross-section in order to reduce its resistance to the forward movement of the machine. This vertical tubular cross tie 8 may communicate with the front corners of the cooling elements 4 and thus ensure the escape of air or the discharge of water according to the more or less inclined position assumed by the radiator.

It will be readily understood that the preceding radiator offers a very small amount of resistance to the forward movement of the machine owing to the juxtaposition of the two headers 1 and 2 and to the loop-shaped profile which is given to the cooling elements. Furthermore when the machine and its radiator move in the direction indicated by the arrow 11, the cold air comes in contact with the cooling plates or gills 4 directly without being in any way obstructed or hindered by the headers.

Finally, the loop-shape given to the cooling elements facilitates to a great extent the free expansion of these elements when the motor is being started up.

It is obvious of course that numerous different shapes may be given to the cooling elements which form the loop. Thus for example a longitudinal section with a taper profile 12 may be given to these elements (see Figure 3) that is to say one which is wide at the front and tapers off to a point at the rear, the headers 1 and 2 thus completing the taper-form of the whole of the radiator.

A longitudinal section may also be given to the cooling elements such that the external profile 13 thereof effects the form of a heart (see Figure 4) which facilitates the penetration of the radiator through the air.

The longitudinal section of the cooling element 4 instead of having a profile formed by portions of straight lines connected to each other by rounded portions (see Figures 1 to 4) may on the contrary have a profile constituted by a continuous curve which is convex towards the exterior of the radiator an arc of circumference 14 for example (see Figure 5).

Figure 6:
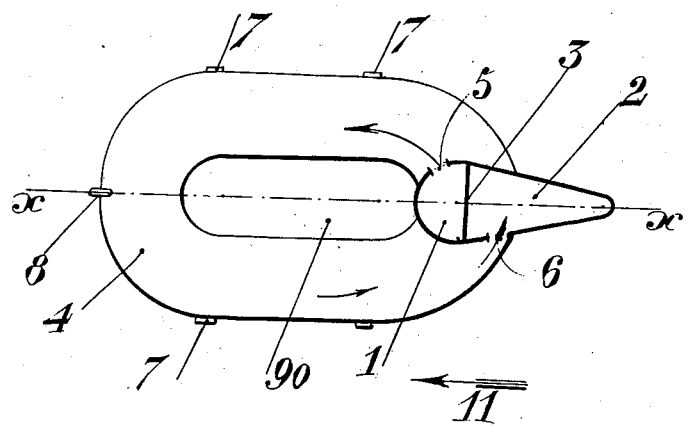
Figure 7:
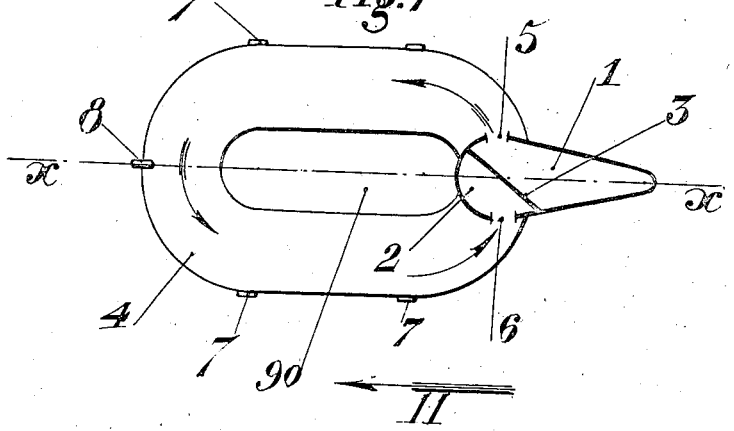

The arrangement of the partition or midfeather 3 which separates the two headers 1 and 2 may obviously be modified. For example in Figure 6 the partition or midfeather 3 is placed at right angles to the longitudinal axis $x$—$x$ of the radiator. This partition or midfeather may also be so arranged as to assume a certain amount of inclination with respect to this longitudinal axis $x$—$x$ (see Figure 7).

The present invention extends to the different cooling elements hereinbefore described (see Figures 1 to 7) whatever be the method of manufacture employed in the construction of these elements. The invention extends also however, to various methods of manufacture which are particularly advantageous and will be hereinafter described.

Firstly (see Figures 8 to 11) the cooling element may be constituted by the aid of two thin metal sheets 16 and 17. The edge 18 of the sheet 16 is folded down on to the edge of the sheet 17 and then fullered. This edge 18 is cut out at 19 and 20 only so as to permit of the fitting of the element into the adjacent header at these two points and of the soldering of this element to the header.

The spaced tubular rivets 21 which clamp together the two metal sheets 16 and 17 also serve to keep them at a suitable distance from each other.

The central partition or buffer which separates the cooling element into two adjacent compartments 22 and 23 is constituted by a strip of tinned copper 24 interposed between the two sheets 16 and 17 and connected to them by solder at 26 and by rivets 27.

Numerous modifications may be made in the method of manufacturing the loop-shaped element. In particular, see Figure 12, each sheet 16 and 17 may be embossed as at 30 and these two portions 30 may be placed in contact with each other and connected together by rivets 31 and by solder thus constituting the partition or midfeather which separates the cooling elements into two chambers or compartments 22 and 23 communicating with each other at their ends.

As shown in Figures 13 to 16 the two metal sheets 16 and 17 may be superposed (see Figure 13) and be stamped out as shown in Figure 14 so as to form two edges 32, 33 which are afterwards turned down on to each other as shown in Figure 15. Finally the central partition is finished off by soldering as at 34 (see Figure 16).

The invention extends also to a particular method of manufacturing the cooling elements. To manufacture one of these elements 100 (see Figures 17 and 18) a sheet of paper 101 or other flexible material such as leather, rubber, etc. is used this sheet being interposed between the two sheets of copper 16 and 17.

The sheet 101 is cut out as shown in Figure 17 so as to form washers 102 at right angles to each tubular rivet 21. These washers are connected together by strips 103. A flange 104 is formed on the sheet 101 over the whole periphery of the element and strips 103 ensure connection between this flange and the rest of the sheet 101.

The flange 18 on the sheet 16 is fullered upon a turned down flange 105 on the sheet 17 and grips the flange 104 of the sheet of paper 101 between this flange 105 and the sheet 16. Soldering as at 106 ensures the fluid tightness of the element over its periphery.

Annular washers of paper or other similar material are gripped between the flanges of the tubular rivets 21 and the adjacent sheets 16 and 17. These washers at right angles to the tubular rivets 21 complete the fluid tightness of the cooling element, this fluid tightness being already ensured by the washers 102 of the sheet of paper 101.

The soldering 106 may be entirely dispensed with as is shown in Figures 19, 20 and 21. For this reason besides the means of fixation by tubular rivets 21 previously indicated, it suffices to prolong at 107, 108 and 109 respectively (see Figure 19) the sheet of paper 101 and the two sheets 16 and 17 and then to turn down the prolongations 107 and 108 on to the prolongation 109 (see Figure 20) and finally to turn back the three prolongations 107, 108 and 109 on to the upper sheet 17 (see Figure 21).

A triple grip on the paper joint is thus obtained which ensures without any soldering perfect fluid tightness of the cooling element over its entire periphery.

The soldering may thus be completely dispensed with and the weight of the radiator materially reduced, which is very advantageous, especially in aviation.

The methods of manufacture (see Figures 17 to 21) are obviously applied not only to loop-shaped cooling elements but in a general way to any narrow-shaped element in which the cooling water circulates.

The radiator shown in Figures 22 to 24 is characterized by the fact that its loop elements are constituted by flattened weldless tubes 120. These tubes, of which there are three for example, each effect in plan a practically elliptical profile, the loops formed by these tubes being fitted one into the other as indicated in Figure 23.

Each of the tubes $120^1$, $120^2$, $120^3$ . . . opens on the one hand into the header 1 into which the hot water from the motor is delivered and on the other hand into the header 2 from which the cooled water passes out to the motor. These two headers 1, 2 are connected to each other and separated from each other by a partition 3. The whole formed by the two headers 1 and 2 thus constituted may approximate to and complete the slender shape of the transverse section of a strut 42 of the machine, as explained in detail hereafter with reference to Figures 34 to 41.

The above described mode of constructing the cooling elements allows of their being made from flattened tubes without any welding, a circumstance which renders these tubes very much lighter than the plates the faces of which are attached or joined to each other by welding. Furthermore the edges of these weldless flattened tubes offer much less resistance to the forward movement of the machine than do the welded edges of the plates with the joined faces which have been used heretofore in the construction of radiators.

The present invention relates also to another improvement in loop radiators. In radiators of this type the bundle or nest of cooling elements 4 is out of the straight as regards the two headers 1, 2 so that these elements have a tendency to subside or collapse under the action of their own weight and the action of the air.

In order to avoid this disadvantage a cross tie or truss 121 (see Figures 25 and 26) constituted by a perforated sheet metal plate is fixed by rivets 122 between the sheet metal plates which constitute the two collectors 1 and 2. This cross tie or truss has notches 123 in it into which the cooling elements 4 of the radiator fit. This cross tie or truss thus keeps the elements suitably separated from each other although the elements are out of the straight with respect to the headers 1, 2.

The invention extends also to particular forms of the cooling elements of the loop radiator. These improved elements are characterized by the fact that they have a curved transverse profile which gives each of the elements a greater power of withstanding the internal pressure of the water and also allows the elements to expand freely under the action of the great variations of temperature of the radiator. It will be seen in particular in Figure 27 that the elements 4 of the loop radiator have their transverse profile curved towards the base of the radiator, the radii of curvature R of all these elements being equal. This particular form greatly facilitates the expansion of the elements 4 when they pass from the temperature of the surrounding air to that of the hot water from the motor when such is running.

It will also be seen that the elements 4 having the same radius of curvature R are set at a greater distance from each other at their central parts than they are at their sides. The consequence of this is that the air which contacts with the central parts is guided to the interior of the radiator without however creating any supplementary resistance, because the air as it expands can always escape through the sides of the radiator.

In the loop radiators with superposed elements such as are shown in particular in Figures 1 and 2, it is necessary to provide at the top and at the base of the elements 4 brackets fixed to the headers 1 and 2, and which combined with the cross ties or trusses 7 and 8 hold the cooling elements 4 horizontal and at a suitable distance from each other.

These brackets form a useless dead weight and increase the total resistance of the radiator to the forward movement of the machine without serving in any way to help the cooling.

In the improved arrangement shown in Figures 28 and 29, each bracket 124 is formed by a cooling element of the radiator. This element is suitably curved and profiled, and offers only a very slight resistance to the forward movement of the machine and participates on the other hand in the cooling of the water of the motor.

In the loop radiators above described the cooling plates 4 are arranged so that their greatest dimension is directed parallel to the direction in which the machine moves. Thus for example it will be seen in Figure 25 that the cooling element 4 presents parallel to the direction of movement 11 of the machine a depth P which is greater than the width L of this element.

On the contrary as is shown in Figure 30 the loop element 4 may be made of such a shape that its width L is much greater than its depth P extending parallel to the direction of movement 11 of the machine.

This particular arrangement has the advantage that the streams of air 125 only come into contact with the cooling plates 4 over a small length, and consequently these cooling elements are bathed over practically the whole of their surface by air at a temperature which is practically equal to the surrounding atmospheric temperature. It will thus be understood that a more regular and more intense cooling of the total surface of the elements is obtained. Greater efficiency of the radiator per unit of surface and unit of weight is therefore obtained.

This arrangement also allows of a larger total cooling surface being grouped on one and the same header which again enables the total weight of the radiator to be reduced.

The present invention extends also to special means for regulating at will the admission of cold air to the radiator. These means comprise substantially shutters mounted to rotate relatively to the radiator so that the front parts of these shutters may at will either move apart from each other and form a funnel which guides a volume of supplementary air into the radiator or on the contrary close up on each other and even bear upon each other and thus interrupt the major portion of the air admitted to the radiator.

A constructional form of this arrangement is shown by way of example in Figure 31.

This arrangement comprises two shutters 35, each of which is pivoted on a pin 36 carried by supporting plates 37 fixed for example to the cross ties 7, 8 of the radiator.

This arrangement works in the following manner; when the shutters 35 are in the position shown by full lines in Figure 31 the air is admitted normally to the radiator. When one of these shutters is moved away from the other so as to bring it into position $35^2$, the arrangement of the two shutters constitutes an air inlet funnel. The volume of air admitted to the radiator and the guiding of the streams of air between the cooling elements 4 up to the outlet of the radiator is ensured.

Finally when the shutters are brought into position $35^3$ the admission of air to the radiator is almost completely cut off.

The shutters 35 may also be brought at will into any intermediate position between $35^2$ and $35^3$, by means of any kind of operating mechanism not shown in the drawings.

The preceding arrangement also permits of the regulation at will of the volume of air admitted per unit of time to the radiator, and, consequently, the cooling power of the radiator.

The two shutters 35 may also be moved in such a way as to bring them both parallel to a current of air flowing in an inclined direction relatively to the longitudinal axis of rotation of the screw.

The part of the shutter situated in rear of the pin 36 may with advantage be made longer than the front part of this shutter which facilitates keeping the shutters in the direction of the current of air, when these shutters are in the normal operative position as shown by full lines in Figure 31.

The invention obviously extends to the preceding means itself that is to say whatever be the type of radiator on which the arrangement is mounted. For example Figures 32 and 33 show in elevation and plan respectively, the application of the preceding arrangement to a radiator of the well known honeycomb type 38.

The present invention extends also to various special methods of mounting a radiator on an aeroplane. For example, Figure 34 shows a radiator similar to that shown in Figures 1 and 2. The two headers 1 and 2 are formed by a sheet 40, the edges 41 of which are joined to the outer surface of a strut 42 of tapered transverse section. A stamped up metal sheet 43 fits on to the front part of the strut 42 and is fixed by its two edges to the metal sheet 40. A partition or midfeather 3 is interposed between the metal sheets 43 and 40 and is soldered along the central geometrical axes of these two metal sheets.

Two juxtaposed headers 1 and 2 are thus obtained the transverse section of which joins with the taper section of the strut 42. In consequence the resistance to the forward movement of the radiator and the strut is little more than that created by this strut alone.

Instead of placing the radiator in front of the strut, as shown in Figure 34, this radiator may also be placed in rear of the strut (see Figure 35). In this case, the two headers 1 and 2 are formed by means of a stamped up metal sheet 45 the flanges 46 of which bear upon the sides of the strut 42. A metal sheet 47 fits round the rear part of the strut 42 and is fixed at its two edges to the metal sheet 45. A partition or midfeather 48 divides the inner chamber thus formed into two adjacent parts which form the inlet header 1 and the outlet header 2.

A whole or unit of two juxtaposed headers is thus obtained, which is attached to the strut 42 so as to conform with and prolong the correct sectional taper form of the strut.

The radiators placed as shown in Figures 34 and 35 may have combined with them the arrangement for regulating the admission of the air shown in Figures 31 to 33, but this addition is of course not indispensable.

The invention extends to the method of mounting the radiator hereinbefore described, whatever be the type of cooling radiator used. It suffices in order to carry out this invention that one header shall be connected to one element of the machine such as a strut, a main girder, etc. in such a way that it will conform to and complete the form of this element this advantageously maintaining the correct taper section.

For example as shown in Figure 36, a radiator with cooling gills 50 may be arranged so that its front header 51 joins on to the rear part of the main girder 52 of a landing carriage, the rear header 53 conforming to the front part of the main girder 54 of this carriage.

The hot water supply pipe 56 and the cold water outlet pipe 57 are also connected to the main girders 52 and 54 and pass afterwards into the fuselage of the machine. These pipes 56 and 57 consequently do not create any additional supplementary resistance apart from the resistance of the radiator itself.

The attachment of the headers 51, 53 to the main girders 52, 54, may be effected either as is shown in Figure 37, if the two main girders are arranged so that their two transverse taper sections are located in the same direction, or as is shown in Figure 38 in the case where the transverse taper sections of the two main girders are located in opposite directions to each other.

A radiator may be mounted in accordance with the arrangement shown in Figures 36 to 38 by interposing this radiator not between the two main girders 52, 54 of a landing carriage but between any two struts or main girders of the machine placed one behind the other and at a certain distance from each other.

In the constructional examples shown in Figures 34 to 38 it has been supposed that the radiator headers conform to the taper shape of the element of the aeroplane, such as a strut, a main girder, etc. but the radiator may also be connected to the aeroplane element in such a way that the header of the radiator completes the taper form of the aeroplane element.

Constructional examples of this modification of the invention are shown in Figures 39 and 41.

It will be noted for example in Figure 39 that the unit or whole constituted by the inlet header 1 and the outlet header 2 for the water which are juxtaposed and separated from each other by the partition or midfeather 3, is placed immediately behind the strut 42 and completes the taper form of this strut constituting the thin part of such taper section.

Figure 40 shows a similar arrangement in which the unit or whole formed by the headers 1 and 2 is placed in front of the strut 42 and completes the taper form of this strut constituting the enlarged portion of such taper section.

Figure 41 corresponds to Figure 37 and shows a radiator 50 interposed between two main girders 52, 54 the headers 51, 53 of this radiator completing the taper section of these two main girders.

The present invention also relates to a particular method of mounting a radiator on an aeroplane which method of mounting such radiator is characterized by the fact that one of the headers of this radiator constitutes the leading edge of the wing of the machine.

Figure 42 shows one mode of carrying out this method of mounting. The front header 60 of a gill radiator 61 extends flush with the upper surface and with the lower surface of the wing 62 and constitutes the leading edge of this wing. The rear header 63 is buried in the interior of the wing.

This method of mounting obviously permits of the reduction of the resistance to the forward movement of the whole wing 62 and radiator 61, this whole only presenting a resistance which is no more than the resistance of the wing alone.

The method of mounting above described obviously applies to all radiators of whatever pattern. In particular, it can be applied to a radiator with juxtaposed headers, a constructional form of which is shown in Figures 1 and 2. This application is shown in Figures 43 and 44.

It will be readily understood that with this method of mounting the radiator out of the perpendicular relatively to the wing the air enters directly between the gills 4 and ensures an intense cooling of the radiator. Furthermore great reduction of the resistance to the forward movement of the whole formed by the radiator and the wing is obtained as has been described above.

The two headers 1 and 2 of the radiator may also be arranged in the wing 62 of the machine (see Figures 45 and 46) so that these two headers, connected at 130 at one portion only of their surface, form the leading edge of this wing. These headers may be of flattened transverse section similar to the collector 2 shown in Figure 45. The cooling elements are formed by weldless flattened tubes 120 each of which communicates at 126 with the header 1 into which the hot water is admitted and at 127 with the header 2 from which the cooled water passes out. The distance separating the points 126, 127 is great enough to allow of a suitable development being given to the elements 120. The elements 120 conform exactly to the shape of the leading edge of the wing 62 so as to avoid the formation of eddies in rear of these elements and all useless projection of these elements with respect to the wing 62.

The cooling element shown in Figure 45 may obviously be constituted by a number of flattened tubes 120 fitted into each other as shown in Figure 23.

Again as shown in Figure 47 two loop radiators may also be arranged on the flanks or sides of the hull 83 of the machine in a symmetrical manner relatively to the longitudinal plane $x$—$y$ of the machine, the two headers 1 and 2 of each of these radiators being attached to each other and secured to the hull.

In Figure 48 are shown various positions which a radiator may occupy relatively to a monoplane aeroplane according to the present invention.

In position 65 the radiator is mounted on the aeroplane so that one of its headers or the whole of its two headers constitutes the leading edge of the wing 62, as has been explained with reference to Figures 42 to 46.

In position 47 the radiator is placed either in front of or behind a main girder 52 of the landing carriage in one of the ways shown in Figures 34 to 41.

In position 70 the radiator is placed either in front of or behind the strut 42 of the aeroplane, in the manner indicated in Figures 34, 35, 39 or 40.

Finally in position 72, the radiator is placed in front of the leading edge of the small lower plane as shown in one of the Figures 42 to 46.

Figure 48 shows in dotted lines the different pipes 73 connecting the hot water outlet from the cylinders to the radiators and the radiators to the circulating pump 74. It will be seen that these pipes are entirely concealed in the interior of the fuselage of the machine and in the various elements of the machine such as main girder, the struts, etc.

Figure 49 shows the various positions occupied by the radiators on a biplane aeroplane with twin motors according to the present invention. In this case in particular will be seen the positions 65 on the wing 75 of the upper plane and the wing 76 of the lower plane, the positions 77 on the strut 78 interposed between the upper plane 75 and the lower one 76. the positions 79 on the main girders 80 of the landing carriage and the positions 81 on the struts 82 connecting the upper plane 75 to the fuselage 85 of the machine.

The present invention extends also to the combination of a feeder with the cooling elements, these elements being connected on the one hand to the feeder and on the other hand to a header contained in the feeder.

This combination may be effected as shown by way of example in Figure 50. The header 1 to which the hot water is admitted is arranged at the lower part of the feeder 2 which is provided with a filling plug 132. The cooling elements 120 are each connected at one end to the header 1 and at the other end to the feeder 2. The arrows in Figure 50 indicate the circulation of water in the apparatus.

The arrangement of the header 1 to which the hot water is admitted in the lower part of the feeder 2 ensures two principal advantages.

Firstly, under the action of the pump any air which may remain enclosed in the upper part of the elements 120 is automatically forced into the feeder and escapes normally outwards at 132.

Furthermore if for any reason any steam be drawn into the circulation of water this steam is compelled to traverse the cooling elements 120 before escaping into the feeder 2. It has therefore every possible chance of being condensed.

This arrangement thus avoids useless loss of water which occurs in the radiators hitherto used in which the hot water enters at the upper part of the radiator and the steam given off from this water escapes as a dead loss into the atmosphere at the highest point of the circulation.

These advantages are particularly valuable in aviation where it is of great importance to reduce the weight of the reserve of water as much as possible.

The invention extends to the cooling arrangement shown in Figure 50 whatever be the position of this arrangement relatively to the machine. The invention extends however also to a particular method of mounting this arrangement on an aeroplane (see Figure 51).

The loop radiator shown in Figure 51 completely occupies the leading edge of the wing 52. The header 1 into which the hot water enters is arranged at the lower part of the wing 62 and directly receives the hot water coming from the motor 131. This water continues to rise in the elements 120 and passes over into the feeder header 2 having a filling plug 132. The cooled water returns from header 2 by way of the pump 133 to the motor 131.

This arrangement does away with the separate feeder usually employed with plate radiators. The feeder 2 which is thus placed in the thickness of the wing does not set up any supplementary resistance to the forward movement of the machine and at the same time dispenses with the pipes connecting the radiator to the feeder.

What I claim and desire to secure by Letters Patent of the United States is:—

1. In a cooling radiator for the motors of aircraft and other vehicles, the combination of an inlet header, an outlet header juxtaposed thereto, and blades hollow for the major part of their surface and the outer profile of which presents the form of a rounded loop, said blades being directly connected to the two juxtaposed headers, the surface of said tubes being substantially parallel to the direction of motion of the vehicle.

2. In a cooling radiator for the motors of aircraft and other vehicles, the combination of an inlet header, an outlet header juxtaposed thereto, the juxtaposed headers presenting a taper in section, and blades hollow for the major part of their surface and the outer profile of which presents the form of a rounded loop, said blades being directly connected to the two juxtaposed headers, the surface of the tubes being substantially parallel to the direction of motion of the vehicle.

3. In a cooling radiator for the motors of aircraft and other vehicles. the combination of an inlet header, an outlet header juxtaposed thereto, and tubes in the form of loops connected to said headers, the exterior profile of the longitudinal section of said tubes being in the form of a continuous curve and the surface of said tubes being substantially parallel to the direction of motion of the vehicle.

4. In a cooling radiator for the motors of aircraft and other vehicles, the combination of an inlet header, an outlet header juxtaposed thereto, tubes each of which comprises two interconnected sheets, and a partition interposed between the two sheets and dividing the free inner space of the tube into two branches communicating freely one with the other and connected respectively with the inlet and outlet headers.

5. In a cooling radiator for the motors of aircraft and other vehicles, the combination of an inlet header, an outlet header juxtaposed thereto, tubes each of which comprises two interconnected sheets, and a partition comprising a metallic band secured between the sheets and dividing the free inner space of the tube into two branches communicating freely one with the other and connected respectively with the inlet and outlet headers.

6. In a cooling radiator for the motors of aircraft and other vehicles, the combination of an inlet header, an outlet header juxtaposed thereto, and blades hollow for the major part of their surface and the outer profile of which presents the form of a rounded loop, said blades being directly connected to the two juxtaposed headers, the surface of the tubes being substantially parallel to the direction of motion of the vehicle and each tube being slight in depth in relation to its width.

7. In a cooling radiator for the motors of aircraft and other vehicles, the combination of an inlet header, an outlet header juxtaposed thereto, said headers being attached to a part of the vehicle and having the form of such part, and tubes connected to said headers, the surface of said tubes being substantially parallel to the direction of motion of the vehicle.

8. In a cooling radiator for the motors of aircraft and other vehicles, the combination of an inlet header, an outlet header juxtaposed thereto, said headers forming a part of the leading edge of the wing of the aircraft, and tubes connected to said headers, the surface of said tubes being substantially parallel to the direction of motion of the vehicle.

9. In a cooling radiator for the motors of aircraft and other vehicles, the combination of an inlet header, an outlet header juxtaposed thereto, said headers forming a part of the leading edge of the wing of the aircraft, and tubes connected to said headers, the surface of said tubes being substantially parallel to the direction of motion of the aircraft and said tubes projecting freely in advance of said edge.

10. In a cooling radiator for the motors of aircraft and other vehicles, the combination of an inlet header, an outlet header juxtaposed thereto, the said headers forming a part of the leading edge of the wing of the aircraft, and tubes connected to said headers, the surface of said tubes being substantially parallel to the direction of motion of the aircraft and said tubes having the form of said edge.

11. In a cooling radiator for the motors of aircraft, the combination of a header of larger dimensions constituting in itself a feeder for the radiator, a second header of normal dimensions juxtaposed to the first mentioned header, said headers forming a part of the leading edge of the wing of the aircraft, and tubes connected to said headers.

12. In a cooling radiator for the motors of aircraft and other vehicles, the combination of an inlet header, an outlet header, tubes having one part connected to the inlet header and another part connected to the outlet header, each of said tubes comprising two sheets having their edges interconnected, spaced rivets for securing said sheets together, a sheet of flexible material interposed between said two first named sheets and having intact parts constituting washers and projections in the plane of the rivets and the length of the interconnected edges of the two first named sheets, and flexible washers interposed between the edges last named and the edges of the rivets.

13. In a cooling radiator for the motors of aircraft and other vehicles, the combination of an inlet header, an outlet header, tubes having one part connected to the inlet header and another part connected to the outlet header, each of said tubes comprising two interconnected sheets, and a sheet of flexible material interposed between each two of said first named sheets and presenting intact portions comprising washers and projections at various points of interconnection of said first named sheets.

14. In a cooling radiator for the motors of aircraft and other vehicles, the combination of an inlet header, an outlet header, tubes having one part connected to the inlet header and another part connected to the outlet header, each of said tubes comprising two sheets interconnected at their edges, a sheet of flexible material interposed between each two of said first named sheets and having intact parts constituting washers and projections at various points of interconnection of said first named sheets, said flexible sheet having an edge secured between the edges of the said two first named sheets.

In testimony whereof I have signed my name to this specification.

ALEXANDRE LAMBLIN.